Figure 1:
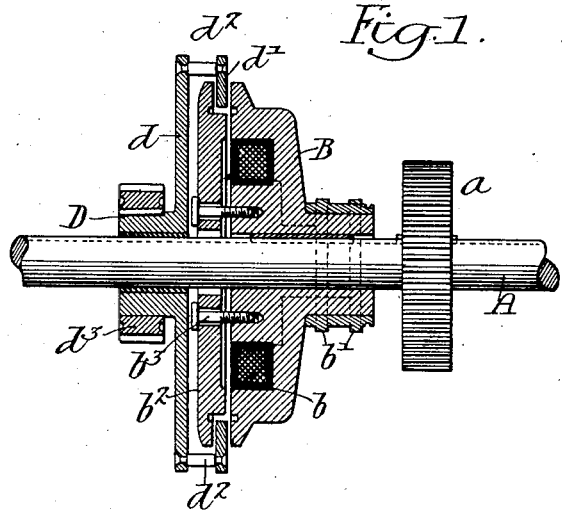

No. 762,623. PATENTED JUNE 14, 1904.
A. C. EASTWOOD.
MAGNETIC CLUTCH.
APPLICATION FILED APR. 1, 1904.
NO MODEL.

Witnesses:
Titus N. Irons.
Frank L. A. Graham.

Inventor:
Arthur C. Eastwood,
by his Attorneys,
Howson & Howson

No. 762,623. Patented June 14, 1904.

UNITED STATES PATENT OFFICE.

ARTHUR C. EASTWOOD, OF CLEVELAND, OHIO.

MAGNETIC CLUTCH.

SPECIFICATION forming part of Letters Patent No. 762,623, dated June 14, 1904.

Application filed April 1, 1904. Serial No. 201,119. (No model.)

*To all whom it may concern:*

Be it known that I, ARTHUR C. EASTWOOD, a citizen of the United States, and a resident of Cleveland, Ohio, have invented certain Improvements in Magnetic Clutches, of which the following is a specification.

One object of my invention is to provide a clutch which while being capable of reliably and efficiently transmitting the amount of power for which it is designed shall have a relatively light driven member, so that a minimum of power will be required for the acceleration of said member when the clutch is thrown into action. In addition it is desired to so design the clutch that its driving member shall be relatively heavy as compared to the driven member in order that said driving member may act as a fly-wheel in reducing the shock and variation in speed of the driving system when the clutch is thrown into action.

Further objects of my invention are to provide improved means for positively disengaging the clutch-surfaces when the magnetizing-coil is deënergized, at the same time so arranging the frictionally-engaging portions of the clutch that they may be easily renewed without dismantling the clutch.

I further desire to provide a clutch of such construction that for a given weight it shall be of much greater capacity than has hitherto been obtainable.

In the present state of the art the driven member of magnetic clutches in all cases forms a part of or is included in the magnetic circuit including the driving member and, as a consequence the dimensions of said driven member are determined by the magnetic flux to be carried rather than the mechanical stress to which said member is subjected in transmitting the power for which it is designed. When it is considered that the flux density in clutches of this class will produce but one-hundred-and-fifty-pounds-per-square-inch pull at their surface of engagement and that only about twenty-five per cent. of this pull is available for transmitting power, while the material of the driven member may be readily made to resist a stress of fifty thousand pounds per square inch, it is evident that the driven member must be made many times heavier in order to carry the requisite magnetic flux than is necessary for safely withstanding the mechanical stresses to which it may be subjected under operating conditions.

The above-noted conditions are particularly noticeable in clutches designed for use in connection with machines such as metal-planers, for during the period of reversal of the platen of such a machine the inertia of the driven member of the clutch, as well as that of the parts connected thereto, must be overcome and these members then accelerated in the reverse direction. Under these conditions the driven member of the clutch first absorbs energy to overcome this inertia due to its motion in one direction and then must receive energy to accelerate it in a reverse direction, the amount of such energy varying directly as the mass of the driven member. In some cases more power is required to reverse the driven member of a clutch than is required in reversing the direction of motion of all the parts of the machine driven by said clutch, so that it will be appreciated by those skilled in the art that it is of great practical importance to provide a clutch with a driven member of relatively small mass.

The above-noted objects I attain as hereinafter set forth, reference being had to the accompanying drawings, in which—

Figure 2:
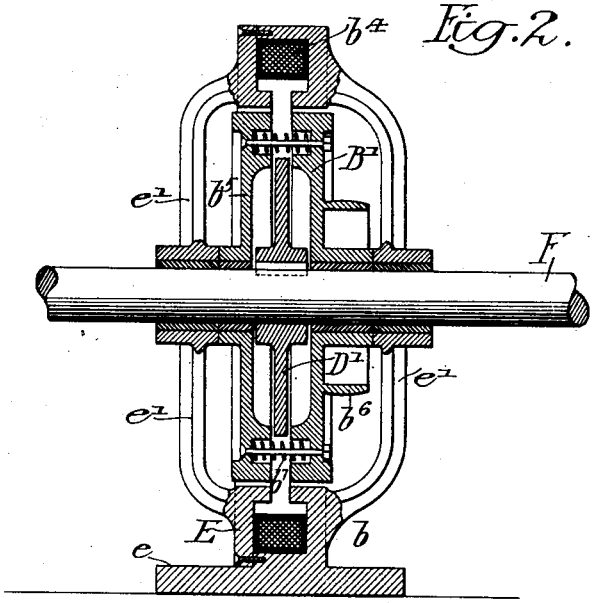

Figure 1 is a sectional elevation of a magnetic clutch constructed according to my invention, both members of said clutch being rotatable; and Fig. 2 is a sectional elevation showing a clutch constructed according to my invention in which the magnetizing-coil is stationary.

In Fig. 1 of the above drawings, A represents a shaft driven from any desired source of power through a gear-wheel $a$, and there is keyed upon said shaft the relatively heavy driving member B of the clutch. This member consists of a casting, as shown, having in one face an annular recess containing the energizing-coil $b$ of the clutch, which is in electrical connection with the two rings $b'$, carried upon the member B in the manner well known in machines of this class. An armature-plate $b^2$ is carried upon a series of bolts or headed pins $b^3$, fastened to the main portion of the member B, being supported thereby in such manner as to be free to move to a limited extent toward and from the face of said member B under the action of the coil $b$, it being, however, compelled to turn with said armature. The second member D of the clutch consists of a sleeve loosely supported on the shaft A and having connected to it a relatively light plate or spider $d$, to whose outer portion a ring $d'$ is held by means of bolts or pins $d^2$. Said ring $d'$ extends between the armature-plate $d^2$ and the face of the main portion of the member B, so as to be frictionally gripped by said parts when these are pulled together by the energization of the coil $b$. A wheel $d^3$ is fixed to the sleeve of the member D, and from this power is taken to any desired mechanism to be driven.

In Fig. 2 the magnet-coil $b^4$ is carried in a frame E, supported by and attached to a base $e$, said frame having arms $e'$ so designed as to form bearings for a driven shaft F, to which is keyed the driven member $D'$ of the clutch. In this instance said driven member consists of a relatively light plate extending between portions of two plates or rings $B'$ and $b^5$, whose outer portions are preferably enlarged and so placed as to be included in the magnetic circuit of a coil $b^4$. To one of these parts of the driving member is connected a pulley-wheel $b^6$, which in the present instance is formed integral with said part and to which power may be applied from any source. The adjacent faces of the parts $B'$ and $b^5$ are recessed, as shown, for the reception of springs $b^7$, by which they are normally held away from each other, it being noted that either or both of said plates may be made free to move upon the shaft F or upon a suitable sleeve thereon to a limited extent.

In both of the constructions illustrated the driving member of the clutch has a portion included in the magnetic circuit of the energizing-coil by which the two members of the clutch are operatively coupled, while, on the other hand, the driven member of the clutch is not included in said circuit, so that it is possible to construct said latter member of some non-magnetic material, such as bronze, &c. As a further consequence of my improved arrangement of parts I am enabled to design the driven member of the clutch from the standpoint of mechanical considerations alone and can thus make it of a much smaller mass than has heretofore been practical. Since the driven member is not called upon to transmit any of the magnetic flux, it may be designed with only the necessary section for transmitting the requisite mechanical stresses and may, moreover, be constructed of the material best suited to the work to be done—as, for example, if it be desired to secure exceptional lightness the driven member may be made of aluminium. It will further be seen that by the use of the springs, as shown in Fig. 2, I have provided a very simple means for positively disengaging the clutch-surfaces when the circuit of the magnetizing-coil is opened. It is further noted that the surfaces of the clutch which frictionally contact with one another may be conveniently renewed without removing the clutch from the shaft upon which it is mounted. It will further be noted that there are two pairs of surfaces in the clutch which are in operative engagement with each other in place of the single pair of surfaces ordinarily found in clutches as at present constructed. As a consequence, with other things equal, a clutch constructed according to my invention will transmit double the power and at the same time usually weigh less than present forms of clutches requiring the same current and of the same size.

I claim as my invention—

1. A magnetic clutch having driving and driven members and a stationary magnetizing-winding arranged to cause said members to be coupled when it is energized, there being but one of said members included in the magnetic circuit of said winding, substantially as described.

2. A magnetic clutch having driving and driven members and a magnetizing-winding, one only of said members being included in the magnetic circuit of said winding and being made in a plurality of parts so disposed as to clamp the other member between them when the winding is energized, substantially as described.

3. The combination in a clutch, of a member having a plurality of relatively movable parts, a second member placed to be clamped between said parts of the first member and a magnetizing-winding placed to attract toward each other the two parts of said first member, the second member being outside of the magnetic circuit of said winding, substantially as described.

4. A magnetic clutch having driving and driven members and a magnetizing-winding, one of said members having two parts placed to clamp the other member between them when the winding is energized, with means carried by the first member for forcing apart said two portions thereof, substantially as described.

5. A magnetic clutch having a magnetizing-winding and driving and driven members of which one only is included in the magnetic circuit of said winding, the member so included being in two parts placed to clamp between them the other member, with positively-acting means for separating the two parts of said members when the winding is deënergized, substantially as described.

6. The combination in a magnetic clutch of a magnetizing-winding and driving and driven members, one of said members having two parts provided with means acting to force them apart, said second member extending between said parts, and being outside of the magnetic field of said winding, substantially as described.

7. The combination in a magnetic clutch including a magnetizing-winding of a member having two parts movable toward and from each other, springs carried by said member between the parts thereof and tending to force them apart, with a second member extending between the two parts of the first member, substantially as described.

8. A magnetic clutch including a magnetizing-winding and driving and driven members, one of said members being of non-magnetic material, substantially as described.

9. In a magnetic clutch, the combination of a magnetizing-winding, a driving member of magnetic material and a driven member of non-magnetic material, substantially as described.

10. In a magnetic clutch, the combination of a magnetizing-winding, a relatively heavy driving member made in two parts and a relatively light driven member placed to be clamped between said parts of the driving member when the winding is energized, substantially as described.

11. In a magnetic clutch, the combination of a magnetizing-winding, a driving member of magnetic material made in two parts and a driven member of non-magnetic material placed to be gripped by said parts when the winding is energized, substantially as described.

12. A magnetic clutch having revoluble driving and driven members and a stationary magnetizing-winding placed to couple said members when it is energized, there being but one of said two members included in the magnetic circuit of said winding, substantially as described.

13. A magnetic clutch having a stationary magnetizing-winding and driving and driven members, one of said members having two parts extending respectively on both sides of the other member, substantially as described.

14. A magnetic clutch having a stationary magnetizing-winding and driving and driven members, one of said members having two parts extending respectively on both sides of the other member, with a spring or springs between said two parts, substantially as described.

15. A magnetic clutch having a stationary magnetizing-winding and driving and driven members, the driving member having two parts placed to be included in the magnetic circuit of said winding, and the driven member being placed to be gripped between said parts and being outside of the magnetic circuit of the winding, substantially as described.

In testimony whereof I have signed my name to this specification in the presence of two subscribing witnesses.

ARTHUR C. EASTWOOD.

Witnesses:
C. W. COMSTOCK,
D. P. BALLARD.